United States Patent
Sakawa

(10) Patent No.: US 7,778,634 B2
(45) Date of Patent: Aug. 17, 2010

(54) RADIO SERVICE AREA QUALITY INFORMATION ACQUISITION SYSTEM

(75) Inventor: Kozo Sakawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 636 days.

(21) Appl. No.: 11/769,851

(22) Filed: Jun. 28, 2007

(65) Prior Publication Data

US 2008/0009279 A1    Jan. 10, 2008

(30) Foreign Application Priority Data

Jul. 10, 2006    (JP)    ............... 2006-189612

(51) Int. Cl.
*H04W 24/00*    (2009.01)

(52) U.S. Cl. ............... 455/423; 455/67.11; 455/115.1; 455/226.1

(58) Field of Classification Search ......... 455/423–425, 455/422.1, 67.11–67.14, 115.1–115.4, 226.1–226.4, 455/432.1–432.3, 435.1–435.3, 437, 452.2, 455/453, 456.1–456.5, 457, 502; 370/328, 370/338, 350

See application file for complete search history.

(56) References Cited

U.S. PATENT DOCUMENTS

| | | | |
|---|---|---|---|
| 7,136,655 B2 * | 11/2006 | Skafidas et al. | 455/450 |
| 2002/0098838 A1 * | 7/2002 | Ikeda et al. | 455/423 |
| 2004/0127191 A1 * | 7/2004 | Matsunaga | 455/403 |
| 2004/0248583 A1 * | 12/2004 | Satt et al. | 455/452.2 |
| 2005/0271002 A1 * | 12/2005 | Abe et al. | 370/328 |
| 2006/0105759 A1 * | 5/2006 | Betge-Brezetz et al. | 455/422.1 |
| 2007/0155395 A1 * | 7/2007 | Gopalakrishnan et al. | 455/453 |

FOREIGN PATENT DOCUMENTS

| | | |
|---|---|---|
| JP | 2000-341204 | 12/2000 |
| JP | 2002-152104 | 5/2002 |
| JP | 2002-335202 | 11/2002 |

* cited by examiner

*Primary Examiner*—Kent Chang
*Assistant Examiner*—San Htun
(74) *Attorney, Agent, or Firm*—Antonelli, Terry, Stout & Kraus, LLP.

(57) ABSTRACT

Area quality information is collected from a user terminal without applying an excessive traffic load to a system. Operation maintenance center (OMC) (307) transmits a confirmation signal to a wireless access terminal AT (305) through a base transceiver station BTS (301), and receives a wireless access terminal identifier from the wireless access terminal. The OMC stores the received identifier of the wireless access terminal correspondingly to an identifier of the base transceiver station. In a case where a performance value acquired from the BTS is a previously determined limit value or less, the OMC reads the identifier of the wireless access terminal corresponding to the identifier of the base transceiver station. The OMC transmits an acquisition instruction of information to the wireless access terminal. The OMC acquires area quality information including position information of the wireless access terminal and radio waves information between the wireless access terminal at the position and the base transceiver station.

12 Claims, 12 Drawing Sheets

RADIO SERVICE AREA QUALITY INFORMATION ACQUISITION SYSTEM

BACKGROUND OF THE INVENTION

The present invention relates to radio service area quality information acquisition system, and particularly to radio service area quality information acquisition system to acquire quality information of a radio area formed by a radio communication system.

In recent years, in a radio communication system, demand for data communication is increasing in addition to voice call, and various communication systems have been adopted in order to realize higher speed/higher quality radio communication. As an example of the communication system, Code Division Multiple Access (CDMA) in which user signals of voice or the like are code-spread and multiplexed, and communication is performed, 1× Evolution-Data Only (1×EV-DO) specialized for data communication, or the like becomes widespread, and even in a mobile communication environment, a user is allowed to perform various communications. In order to efficiently use various radio communication systems, it is necessary that the quality of a radio area formed of radio waves transmitted from a base transceiver station satisfies a quality condition (interference condition) required by the radio communication system. In the environment in which the quality of the radio area does not satisfy the required condition, any high speed radio communication system can hardly prove its worth.

At the time of designing installation of base transceiver stations, a carrier (communication company) installs a base transceiver station at an actual site in accordance with an optimum station installation condition obtained by desk review, such as radio area simulation, to ensure desired quality in a radio area. However, at the actual site, especially at a densely-populated area, the land form is changed by building construction or the like with a passage of time, and at the same time, the transmission environment of radio waves is also changed. Since the change of the transmission environment greatly influences the servicability of the radio communication service and user satisfaction, it is necessary that the carrier periodically checks the quality of the radio area, and confirms whether the original performance of the radio communication system can be provided to the user. Besides, with respect to the occurrence of a user claim, the radio service area quality of the claim object point is immediately confirmed, and it is necessary to quickly determine whether the cause is a defect in a wireless facility or is a radio environment. According to this result, it becomes necessary to fix/correct the wireless facility or to change the facility installation state of an antenna or the like in order to avoid the influence due to the environmental factor.

From now, when Voice over IP (VoIP) service in a radio communication system is developed, Quality of Service (QoS) function to assign a radio link with priority to, for example, a communication service required to be realtime, such as voice, becomes important. In order to realize this function on the radio communication system, as compared with the area quality required by the radio communication system of the related art having no QoS function, higher area quality is always required.

From the above, the confirmation of the radio service area quality is an important work for the carrier to provide the radio communication service, and it is one of important problems how to perform this easily.

FIG. 1 shows an example of a working form of an area quality check of the related art.

In the area quality check of the radio area, the following process is generally performed. First, a radio wave measurement machine and a positioning device (GPS or the like) are mounted in a vehicle, and while driving is performed in an area to be measured, radio wave measurement and positioning are simultaneously performed. The radio wave measurement result and positioning information are continuously recorded in a recording device during the running. After all the measurement is finished, the measurement result is subjected to a map matching processing on a map (for example, a processing to display the strength of the received radio waves by different colors at the measured positions on the map), and the planar grasp of the area quality in the object area becomes possible by seeing the processing result. For example, the measured transmission and received power, the ratio of a carrier wave to an interference wave, and the position information are used, and the map matching view in which the level of values are expressed by different colors at corresponding positions on the map is confirmed, so that it is possible to easily grasp a weak electric field region in the object area and a call processing performance deteriorated region. By grasping such information, the installation condition (for example, antenna orientation, base transceiver station transmission power, etc.) of the base transceiver station facility is changed and adjusted, and the radio wave condition in the object area can be improved.

Besides, there is a proposal relating to area quality information acquisition in which a user terminal is used, the user terminal transmits radio wave information to a base transceiver station side by some trigger, and an upper operation maintenance center stores the wave information into a server, and automatically edits the information into a necessary form (for example, map matching of the radio wave information).

For example, patent document 1 discloses an apparatus which includes position information/measurement value reception means for receiving position information of a mobile station transmitted from the mobile station and a measurement value of wireless quality, and develops the received position information and the measurement value of the received radio wave quality on a map. Patent document 2 discloses a system and a method in which when a periodic report timer is time-out, the position information and quality information of a mobile station are reported to a base transceiver station. Patent document 3 discloses that when a measurement start condition is satisfied, with respect to a cellular phone, transmitting/pause is repeated a specified number of times, and communication quality to antennas for cellular phones installed at respective places is measured. Besides, it is disclosed that when a measurement value transmission condition is satisfied, the measurement value is transmitted from the cellular phone to the communication terminal of a data collection center.

Patent document 1: JP-A-2002-152104
Patent document 2: JP-A-2000-341204
Patent document 3: JP-A-2002-335202

SUMMARY OF THE INVENTION

Hitherto, in order to confirm the area quality, it is necessary to prepare a special vehicle having high capacity power supply, and it is also necessary to secure persons who get into this vehicle and perform driving, navigation of the running route and monitoring of the measurement machine. Thus, for the confirmation of the area quality, there occur enormous costs and processes, such as equipment/machine expenses and personnel expenses. As one of measures to reduce the costs and processes, it is conceivable that necessary information is periodically transmitted to the base transceiver station (upper server) from a terminal of a general user. However, unless information, such as the trigger of transmission, the content of information acquired at the terminal, and the number of object terminals, is suitably controlled, there is a possibility that the wireless line capacity is filled with only the area quality information. Besides, when it is assumed that the information is acquired from a general user terminal, it is necessary to perform an operation control so that the user's use of the terminal is not obstructed.

Under these problems, in the technique disclosed in the patent document 1, the transmission trigger of the terminal is fixed, and there is a case where a large influence is exerted on the congestion of the wireless line or the use state of the user terminal. Besides, information acquisition limited to a necessary area (station) can not be performed, and there is a case where an unnecessary data traffic load is given to the system. Incidentally, the dedicated server disclosed in the patent document 1 merely outputs instructions for measurement start.

The technique disclosed in the patent document 2 is the information transmission completely on the initiative of the terminal, and is not suitable for a case where confirmation of area quality of a desired area is desired to be temporarily performed to deal with the user's claim.

The technique disclosed in the patent document 3 is such that the apparatus for the radio wave quality measurement is mounted in traffic means or the like, and the terminal of a user is not used. As the condition of the measurement start and the condition of the measurement value transmission, although time designation, point designation and the like are performed, consideration is not given to the traffic load, the terminal use of the user, and the like.

In view of the above, it is an object of the invention to provide radio service area quality information acquisition system in which an acquisition condition of area quality information is set according to an actual area state, so that the area quality information is collected from a user terminal whose consent is previously obtained, and area quality information confirmation can be performed. Besides, it is another object of the invention to enable both periodic information acquisition and temporal information acquisition by an area quality acquisition condition previously set through an operation maintenance center.

It is another object of the invention to provide such that in a case where area quality information is desired to be periodically acquired, an acquisition condition of the area quality information is set in a user's general user terminal from an operation maintenance center through a wireless base transceiver station, so that the set general user terminal periodically uploads the area quality information in accordance with the condition. Besides, it is another object of the invention to acquire area quality information without performing an existing radio wave measurement work requiring a special measurement machine. It is another object of the invention to easily acquire area quality information by performing a similar process also in a case where area quality information is temporarily acquired.

Besides, it is another object of the invention to realize collection of area quality information from a user terminal without applying an unnecessary data traffic load to a radio communication system by finely setting an area quality information acquisition condition. It is another object of the invention to provide such that an operation maintenance center determines a user terminal, which is made to upload area quality information, in view of performance states in respective devices in a system, and the operation maintenance center issues a stop instruction of area quality information collection in view of the performance states also during area quality information acquisition. It is another object of the invention to realize, by this, the acquisition of the area quality information without generating an excess system load.

Further, it is another object of the invention to provide a system in which exchange between a user terminal and an operation maintenance center, such as an area quality information acquisition instruction from the operation maintenance center to the user terminal and an information report from the user terminal to the maintenance terminal, is all performed in an application layer, so that an influence is not exerted by the radio access method of the radio communication system or the applicable standard specification. It is another object of the invention to provide easy realization in an existing radio communication system without giving an impact of hardware change to the existing system.

In order to achieve the objects, according to an aspect of the invention, in a general user terminal for radio communication owned by a user whose consent is previously obtained, a dedicated application operated under instructions of an upper operation maintenance center uses an operating system or an application platform originally installed in the general user terminal. The general user terminal follows the condition specified by the upper operation maintenance center, and uploads area quality information acquired by the general user terminal to the upper operation maintenance center.

It is assumed that the user's consent is previously obtained with respect to the installation of the dedicated application to the general user terminal, and with respect to a call occurring when the dedicated application uploads the area quality information, the billing is free. Besides, favorable treatment in some form, such as discount a bill to the user or giving a privilege, can be given according to the number of times of upload of the area quality information.

The cooperation of the mobile communication system and the user terminal in the area quality information acquisition is one of the points of the invention.

Besides, it is one of the features that the operation maintenance center controls the information acquisition in view of the system load so that an excessive system load is not applied in the information acquisition of the radio area quality. It is one of the features that the operation maintenance center independently selects and controls the general user terminal, which is made to upload, in view of the system load so that an excessive system load is not applied in the information acquisition of the radio area quality.

According to the first solving means of this invention, there is provided radio service area quality information acquisition system comprising:

a base transceiver station that communicates with a plurality of wireless access terminals, and measures and outputs a performance value indicating a throughput of its own apparatus, the number of call connections, or receiving condition at user's terminal; and a maintenance apparatus that acquires area quality information of a radio area of the base transceiver station in accordance with the performance value of the base transceiver station, wherein the maintenance apparatus transmits a confirmation signal to the plurality of wireless access terminals through the base transceiver station, receives an identifier of the wireless access terminal transmitted from one or the plurality of wireless access terminals having received the confirmation signal, stores the received identifier of the wireless access terminal correspondingly to an identifier of the base transceiver station, acquires a performance value of the base transceiver station from the base transceiver station, reads an identifier of a first wireless access terminal corresponding to the identifier of the base transceiver station in a case where the acquired performance value is a previously determined limit value or less, transmits an acquisition instruction of information to the first wireless access terminal in accordance with the read identifier of the first wireless access terminal, and acquires the area quality information including position information of the first wireless access terminal and radio waves information between the first wireless access terminal at the position and the base transceiver station, which is transmitted from the first wireless access terminal in accordance with the acquisition instruction.

According to the second solving means of this invention, there is provided radio service area quality information acquisition system comprising:

a base transceiver station that communicates with a plurality of wireless access terminals, and measures and outputs a performance value indicating a throughput of its own apparatus, the number of call connections, or a user reception state; and a maintenance apparatus that acquires area quality information of a radio area of the base transceiver station, wherein the maintenance apparatus acquires the performance value of the base transceiver station from the base transceiver station, determines a transmission cycle of information from the wireless access terminal based on the acquired performance value, sets an acquisition condition including a type of radio waves information acquired by the wireless access terminal, a transmission time period, and the determined transmission cycle, transmits the set acquisition condition and an acquisition instruction to the wireless access terminal, and acquires area quality information including position information of the wireless access terminal and radio waves information between the wireless access terminal at the position and the base transceiver station, which is transmitted from the wireless access terminal at the determined transmission cycle in accordance with the acquisition instruction.

According to the invention, it is possible to provide such that in a case where area quality information is desired to be periodically acquired, an acquisition condition of the area quality information is set in a user's general user terminal from an operation maintenance center through a wireless base transceiver station, so that the set general user terminal periodically uploads the area quality information in accordance with the condition. Besides, according to the invention, it is possible to acquire area quality information without performing an existing radio wave measurement work requiring a special measurement machine. According to the invention, it is possible to easily acquire area quality information by performing a similar process also in a case where area quality information is temporarily acquired.

Besides, according to the invention, it is possible to realize collection of area quality information from a user terminal without applying an unnecessary data traffic load to a radio communication system by finely setting an area quality information acquisition condition. According to the invention, it is possible to provide such that an operation maintenance center determines a user terminal, which is made to upload area quality information, in view of performance states in respective devices in a system, and the operation maintenance center issues a stop instruction of area quality information collection in view of the performance states also during area quality information acquisition. According to the invention, it is possible to realize, by this, the acquisition of the area quality information without generating an excess system load.

Further, according to the invention, it is possible to provide a system in which exchange between a user terminal and an operation maintenance center, such as an area quality information acquisition instruction from the operation maintenance center to the user terminal and an information report from the user terminal to the maintenance terminal, is all performed in an application layer, so that an influence is not exerted by the method of the radio communication system or the applicable standard specification. According to the invention, it is possible to provide easy realization in an existing radio communication system without giving an impact of hardware change to the existing system.

DESCRIPTION OF THE PREFERRED EMBODIMENT OF THE INVENTION (System Structure)

Figure 1:
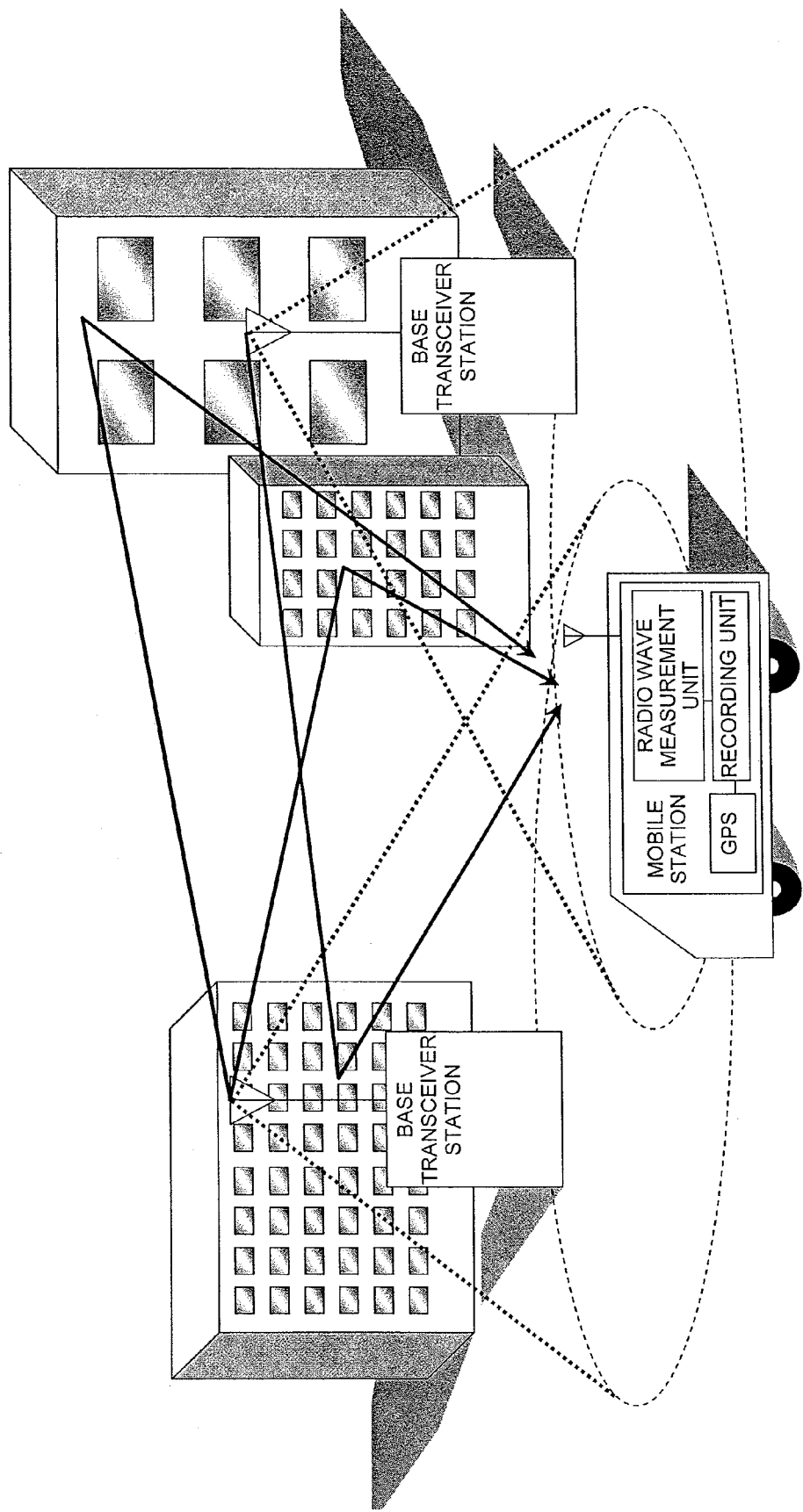
FIG. 1 is a schematic view of area quality information acquisition in a mobile communication system of the related art.
Figure 2:
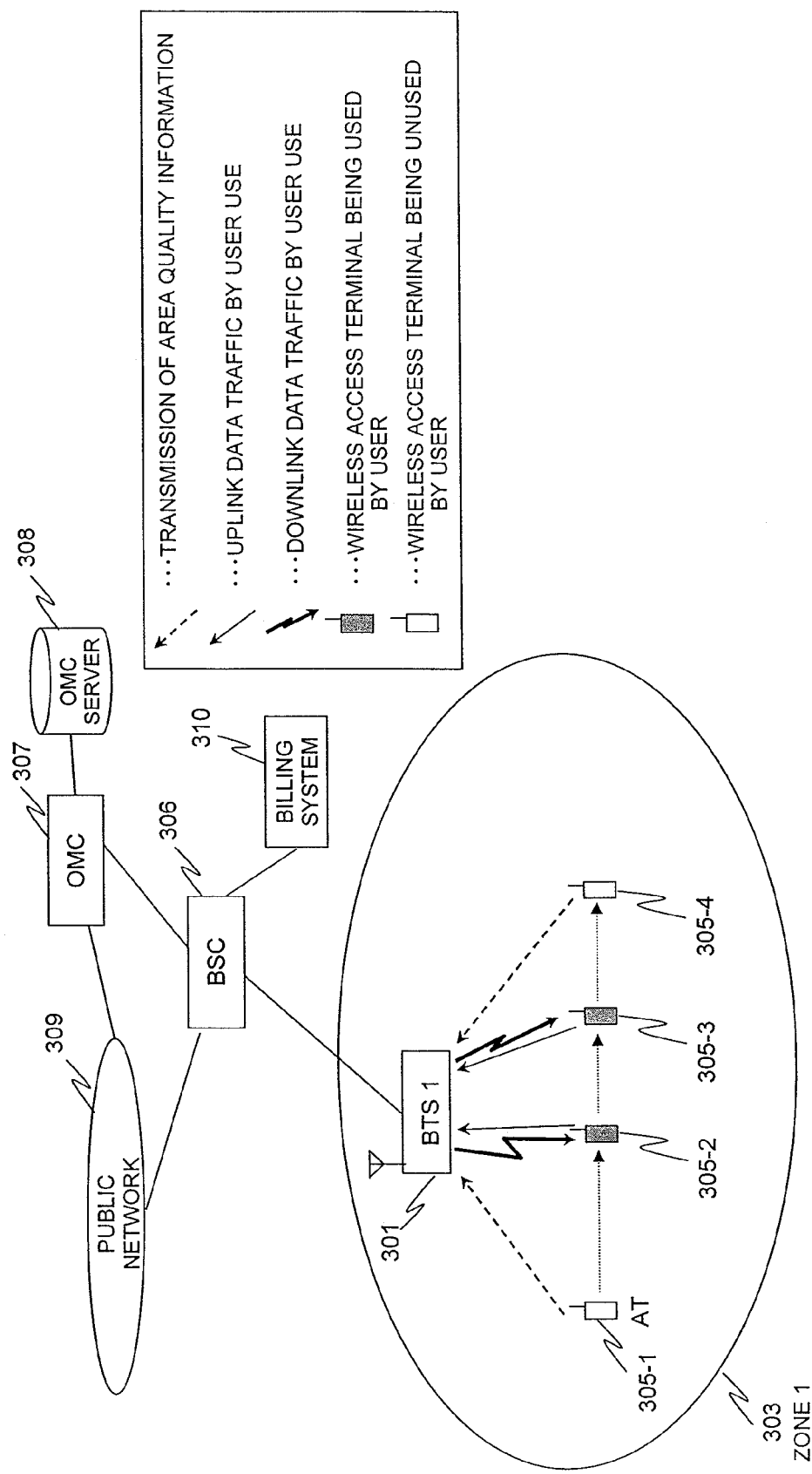
FIG. 2 is a system structural view of a mobile communication system of an embodiment.
Figure 3:
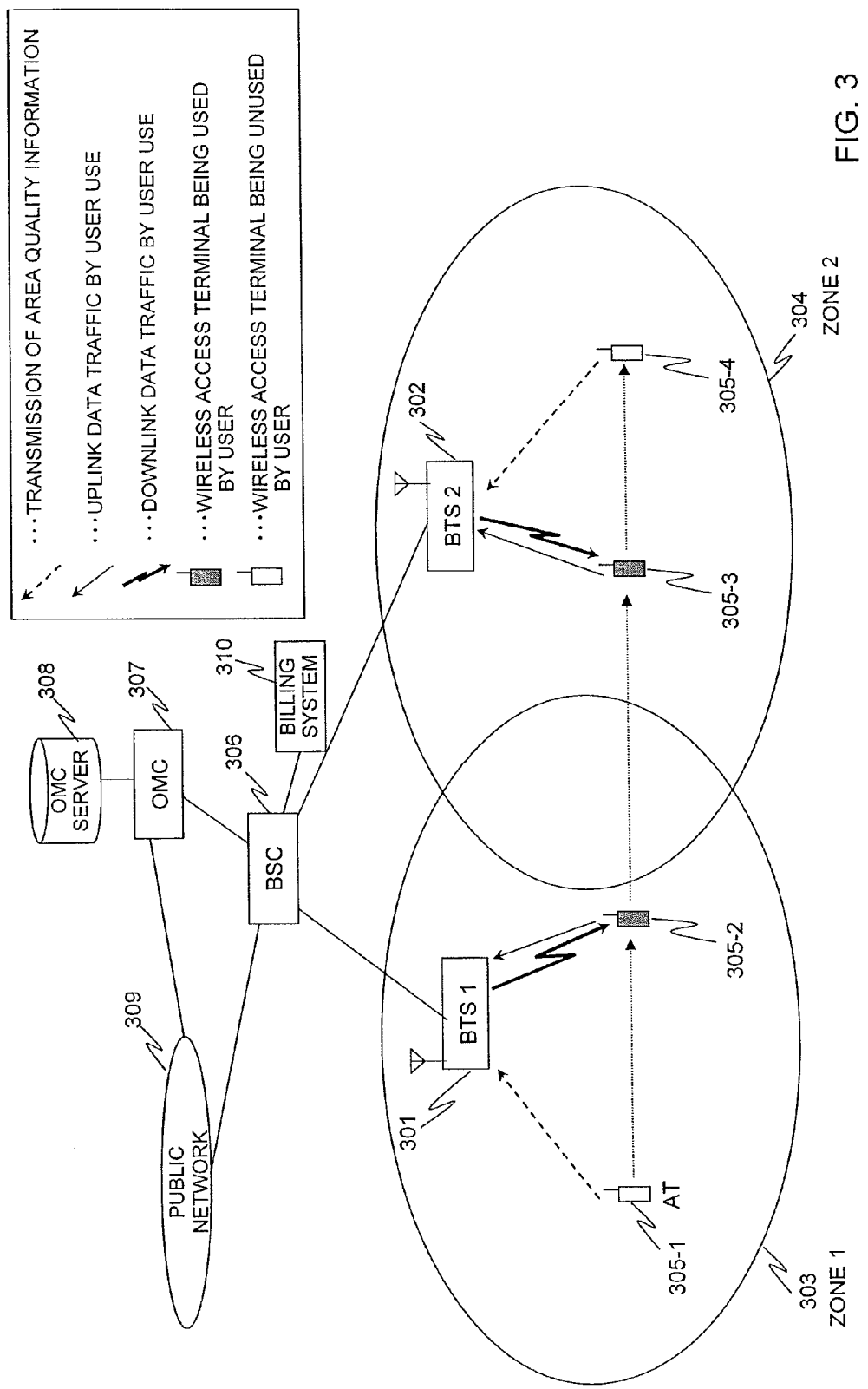
FIG. 3 is a system structural view of the mobile communication system of the embodiment.

FIG. 2 and FIG. 3 are system structural views of a mobile communication system (radio communication system) of an embodiment.

The communication system includes a wireless base transceiver station (BTS) 301, a wireless access terminal (general user terminal owned by a user, AT) 305, a wireless base station controller (BSC) 306, an operation maintenance center (OMC) 307 and an OMC server 308. Further, a billing system 310 may be provided.

The general user terminal AT (305-1) owned by the user communicates with the base transceiver station BTS1 (301) in a zone 1 (303). The BTS1 (301) and BTS2 (302) are connected to a public network (309) such as an IP network, the billing system (310), and the operation maintenance center OMC (307) through the base station controller BSC (306) connected by wire.

A description will be given to the case of the wireless access terminal AT (305), the wireless base transceiver station BTS1 (301), the wireless base station controller BSC (306), the operation maintenance center OMC (307) and the OMC server (308).

The AT (305) is a general-purpose wireless access terminal, and realizes a user interface for call connection, radio communication with the BTS1 (301), and positioning function. The BTS1 (301) realizes a radio communication function with the AT, and a broadcast function of traffic data. The BSC (306) realizes functions such as connection control, inter-station switching control (handoff control), broadcast function of traffic data to the connected BTS, and billing information control. Further, the OMC (307) and the OMC server (308) include an input/output interface for enabling a system administrator to operate and a display device, and realizes functions such as generation of setting information (condition information) for area quality information acquisition, aggregation of collected area quality information and map matching processing, and storage of the collected data into the OMC server (308).

(Operation)

Figure 4:
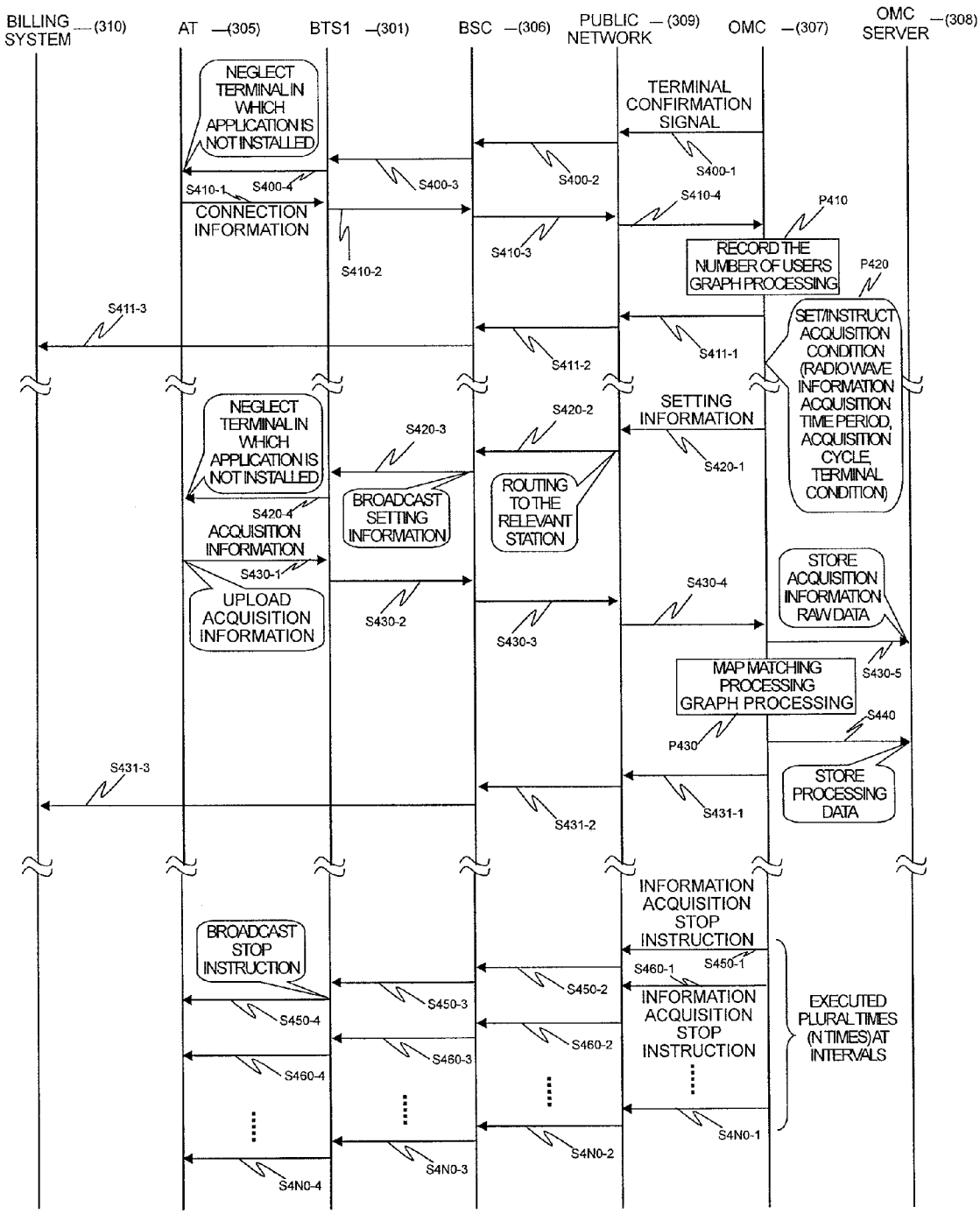
FIG. 4 is a sequence view up to area quality information acquisition in the embodiment.

FIG. 4 is a sequence view of operation from area quality information acquisition to an upload in the embodiment.

First of all, for example, for the purpose of grasping the number of ATs existing for each BTS in the mobile communication system, a terminal confirmation signal is transmitted from the OMC (307) to the AT (305) through the BSC (306) and the BTS1 (301). Incidentally, the signal may be transmitted to the ATs in plural areas through plural BTSs. When an AT (305) (hereinafter referred to as an object terminal) in which a dedicated application for area quality information acquisition/upload is previously installed receives this terminal confirmation signal (S400-4), this AT (305) transmits connection information to the OMC (307) through the BSC (306) and the BTS1 (301) (S410). Incidentally, the AT in which the dedicated application is not previously installed neglects the terminal confirmation signal.

The connection information includes, for example, an object station (BTS) or an identifier (PN) of a sector with which the AT (305) is presently call-connected or can communicate, the position information (latitude/longitude information) of the AT, and unique identification information (suitable identifier such as an identification number) owned by the AT.

The OMC (307), which has received the connection information at step S410 as the response to the terminal confirmation signal (S400), lists how many object ATs exist for each BTS (P410). For example, based on the identifier of the BTS included in the received connection information, the number of receptions of the connection information is counted for each BTS, and the count value is stored for each identifier of the BTS. Besides, the identification information of the AT is stored for each identifier of the BTS.

Incidentally, when the position information included in the connection information (S410) is used, based on the connection information (S410), the OMC (307) can draw the position where the AT exists on the map, or can create a list of the number of users for each station. The OMC (307) may display the created list.

The system administrator confirms the information generated and displayed by the OMC (307), and can grasp whether a sufficient number of ATs for determination of the area quality exist in the object area for which the area quality is desired to be confirmed or in the vicinity of the object station. The information obtained based on the connection information of the AT is used, and at step P420, the system administrator determines the acquisition condition of the area quality information and may set it in the OMC (307).

Next, the OMC (307) sets the acquisition condition of the area quality information (P420). As the acquisition condition of the area quality information set here, there is, for example, the type of radio waves information, an acquisition time period (transmission time period), an acquisition cycle (transmission cycle), an AT condition or the like. As the type of the radio waves information, the radio wave information acquired and calculated by the AT in the communication system can be used. For example, there is the received radio waves strength RSSI (Received Signal Strength Indicator) [dBm], the ratio of carrier wave to interference wave C/I (Carrier to Interference Noise Ratio) [dB], the identifier PN (pseudo Noise) code of a station/sector with which the AT communicates, received carrier wave power C [dBm], or the ratio of received pilot power per chip to all received spectrum density Ec/IO [dB]. Identifiers are previously assigned to the respective pieces of radio waves information, and one or not less than two of the identifiers can be selected. Although the information acquired and calculated by the AT varies according to the radio communication system, the radio waves information necessary for each system to keep the communication quality is acquired and calculated in the insides of all general user terminals, and in this embodiment, the radio waves information originally owned in the inside of the existing general user terminal can be used.

The acquisition time period indicates the time period when the AT transmits the acquisition information. The acquisition cycle indicates the cycle in which the AT transmits the acquisition information or the AT extracts the acquisition information and stores it in the memory.

The AT condition is the condition for selection of the AT which is made to transmit the area quality information to the OMC (307). In order to transmit the area quality information, in this embodiment, the dedicated application is previously installed in the AT, however, all ATs in which the dedicated application is installed are not necessarily used as the AT to transmit the area quality information. In order to prevent an unnecessary data traffic load from being applied to the radio communication system, the number of ATs which are made to transmit the area quality information is optimized according to the number of users already contained, and the total throughput value in station/sector units.

For that purpose, a system control condition (limit value) $\alpha$ is previously set in the OMC (307) by the system administrator. The system limit condition $\alpha$ means the upper limit value to allow communication for area quality information acquisition with respect to a performance value indicating a user reception state, such as the total throughput in station/sector units or the number of call connections. Incidentally, $\alpha$ is not necessarily represented by one value. In the case where it is necessary to determine the performance of the system by using plural parameters, a exists for each of the parameters. Here, the system limit condition where plural values can exist is generically called a. Basically, the OMC (307) operates to acquire the area quality information within the range of the system limit condition a. Thus, the OMC (307) always monitors the performance values of all BTSs and BSCs through which the area quality information is acquired. Incidentally, with respect to the object BTS and BSC, the performance value may be obtained at each time.

Thus, although the AT condition can be arbitrarily specified by the system administrator, the OMC (307) can independently specify the AT to transmit the area quality information in view of the performance value of the BTS or BSC. Besides, the OMC (307) selects the BTS in which the number of ATs connected to and communicating with the BTS is a previously determined number or more, and the performance value satisfies the specified condition α, and may select the plural ATs in the BTS. By this, for example, with respect to the area of the wide range covered by the BTS, the area quality information can be acquired.

Figure 5:
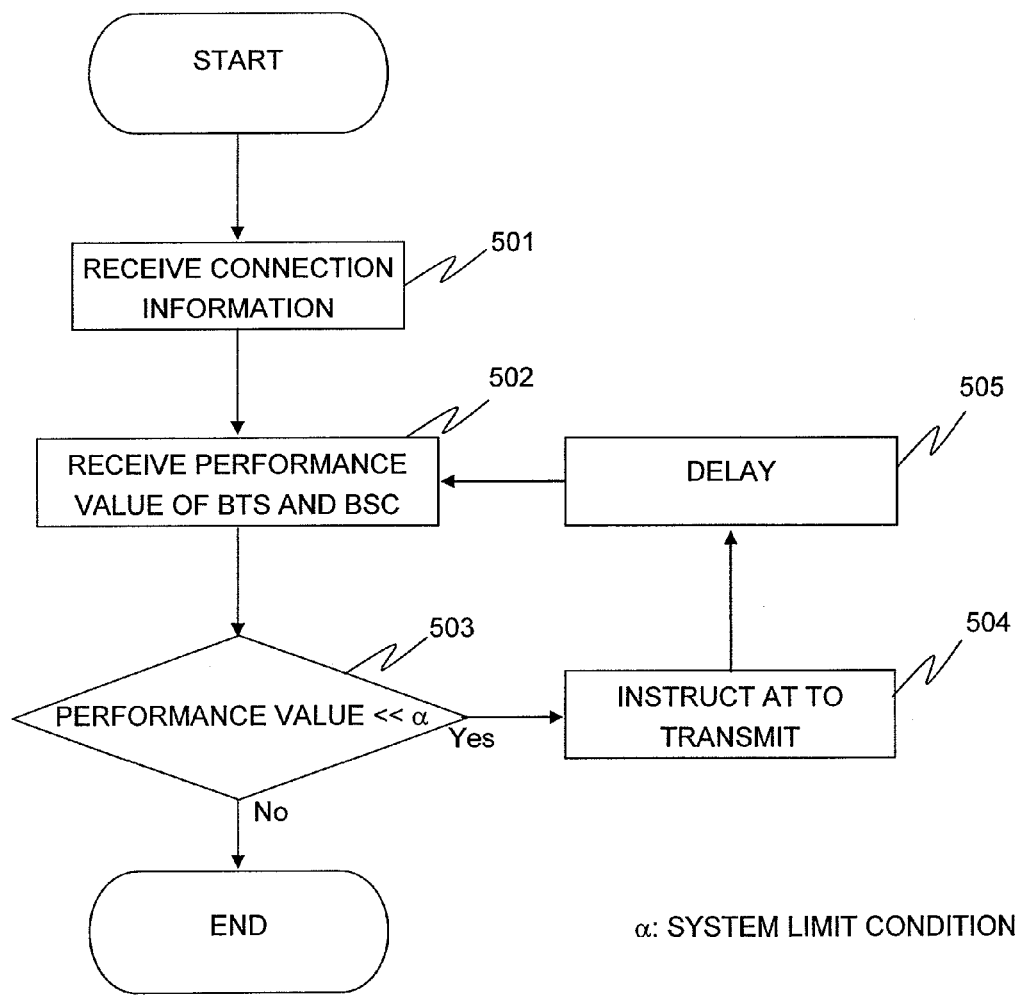
FIG. 5 is a flowchart relating to an operation maintenance center operation for object terminal selection in the embodiment.

FIG. 5 is a flowchart relating to the operation of the operation maintenance center OMC for object terminal selection. The procedure in which the OMC (307) independently specifies the AT to transmit the area quality information will be specifically described with reference to the flowchart of FIG. 5. This corresponds to the processing of S410 and P420 of FIG. 4.

The OMC (307) receives the connection information (501, FIG. 4: S410-4), and can grasp which AT is connected to which station (sector). The OMC (307) collects the performance value of the object station (BTS) to acquire the area quality information and the BSC connected thereto (502). For example, in the case of periodic information acquisition, the object station to acquire the area quality information can be determined in accordance with a previously determined schedule. In the case where information of a specific BTS is desired to be temporarily acquired, the object station can be made the BTS. Incidentally, the performance value is collected from, for example, the BTS or BSC. The OMC (307) compares the acquired performance value with the system limit condition α (503). Here, for example, the system limit condition α can be made a previously determined threshold. When the performance value is the system limit value or less, an instruction of area quality information transmission and setting information are sent to one of the object terminals connected to the object station (504, FIG. 4: S420). Incidentally, the number of the object terminals is not limited to one, and plural terminals are selected and the instruction and the like may be sent to each of them. The number of terminals to which the instructions are sent may be determined based on the performance value and the system limit condition. For example, when a difference between the performance value and the system control condition is large, the number of terminals may be made large, while the difference between the performance value and the system control condition is small, the number of terminals may be made small.

Hereinafter, a return is made to processing 502 of FIG. 5, and as long as the performance value is the system limitation condition or less, the number of object terminals which are made to transmit the area quality information is increased (502 to 505). At this time, the OMC (307) grasps the object terminal and the area quality information transmission instruction state. Incidentally, since it is conceivable that a time is required before the influence of the increase of the ATs to transmit the area quality information appears in the performance value of the BTS and the BSC, DELAY is included in the flow of FIG. 5 in order to cause the influence of the increase of the ATs to be certainly reflected in the information acquired at processing 502.

The billing for the communication necessary for the area quality information transfer between the AT (305) and the OMC (307) can be made not to be performed. The OMC (307) cooperates with the BTS and the BSC based on the connection information received at step S410, and manages the call connection recording of the communication performed by the respective ATs to transmit the area quality information. The managed call connection recording for each AT is transmitted as the area quality call connection information to the billing system (310) (S411, S431). The billing system (310) receives the area quality call connection information (S411, S431), and performs the processing to nullify the billing for the call connection performed for the area quality information upload by the AT indicated by the information. The transmission trigger of the area quality call connection information from the OMC (307) to the billing system (310) can be performed at, for example, any time after the area quality information is received by the OMC (307) at after-mentioned step S430 and at the time point when the processing load in the OMC (307) is light. Besides, it may be after the OMC (307) receives the connection information at step S410. However, for example, in the case where the receiving interval of the area quality information is short, the area quality call connection information is collected in a certain time interval and may be sent to the billing system (310). Incidentally, as long as the area quality call connection information is not received from the OMC (307), the billing system (310) does not perform the nullification processing of the billing.

The setting information including the acquisition condition of the area quality information set by the OMC (307) or inputted to the OMC (307) by the system administrator is transmitted to the AT satisfying the set terminal condition through the BSC (306) and the BTS1 (301) (S420). When the AT as the object terminal receives the setting information (S420-4), in accordance with the content of the setting information, the acquisition/transmission of the area quality information is performed under the specified condition. Incidentally, the details of the processing of the AT will be described later.

The acquisition information transmitted by the AT (305) is sent to the OMC (307) through the BTS1 (301) and the BSC (306) (S430). The OMC (307) having received the acquisition information transfers the acquisition information (S430) to the maintenance server (308) (S430-5). Further, the OMC (307) performs the map matching processing based on the acquisition information (P430). The maintenance server (308) stores the acquisition information received at step S430-5. Besides, data (S440) subjected to the map matching processing is periodically overwritten and stored in the maintenance server (308).

After this, the AT (305) repeatedly performs the acquisition/transmission of the area quality information till the expiration of the acquisition time period specified by the setting information (S420).

In the case where the series of processings are desired to be ended before the expiration of the acquisition time period of the area quality information according to the convenience of the system administrator, the increase of the performance value or the like, the system administrator uses the OMC (307), or the OMC (307) automatically issues an information acquisition stop instruction (S450). The AT (305) having received this instruction immediately stops the processing. In the one issuance of the information acquisition stop instruction (S450), the OMC (307) repeatedly transmits the stop instruction at definite time intervals (S460 to S4N0). The time interval and the repetition number follows the condition previously set in the OMC (307) by the system administrator. Here, the reason why the stop instruction is repeatedly transmitted is that in the case where there accidentally occurs a phenomenon in which the stop instruction can not be received according to the condition of received radio waves at the AT, in order to prevent that a stop is not completed by this, the stop instruction is additionally transmitted to certainly make the stop.

Incidentally, the OMC (307) always compares the performance value (for example, the total throughput in station or sector, the number of call connections, etc.) of the BTS and the BSC through which the area quality information is acquired with the system limit condition α set by the system administrator in advance.

Figure 6:
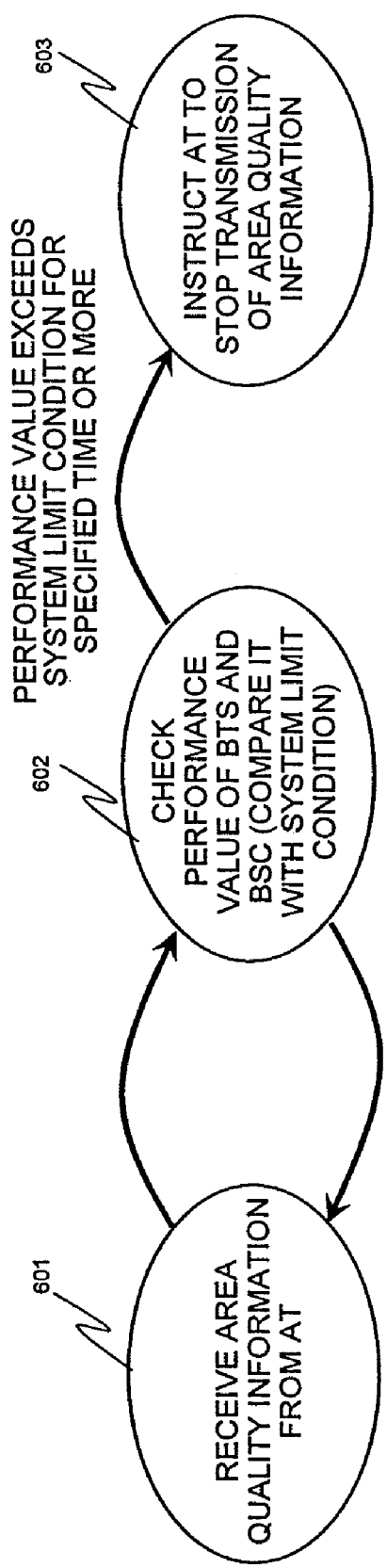
FIG. 6 is a state transition view of the operation maintenance center operation in the embodiment.

FIG. 6 is an explanatory view of station transition relating to this operation. When the transmission of the area quality information by the AT is started, the OMC (307) basically repeats the transition between states 601 and 602. In the case where the BTS or the BSC continuously exceeds the system limit condition α in a certain time previously set by the system administrator, even before the expiration of the acquisition time period of the area quality information, the OMC (307) changes to a state 603, and issues the information acquisition stop instruction (S450).

Figure 7:
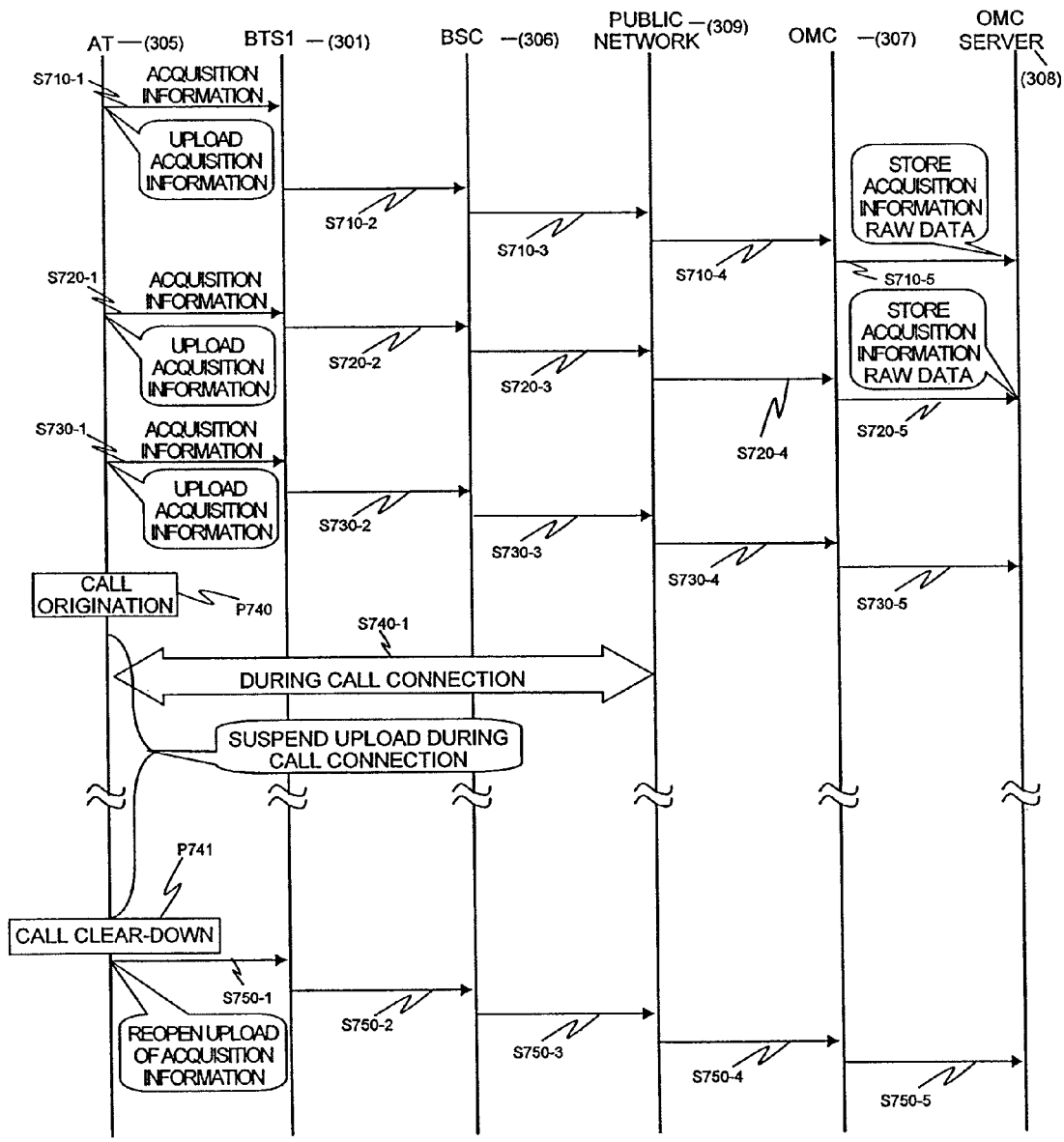
FIG. 7 is a sequence view up to area quality information acquisition in the embodiment.

FIG. 7 is an operation sequence view when a user originates a call.

Next, with reference to FIG. 7, a description will be given to an operation sequence when the user originates a call while the repeat processing of acquisition/upload of the area quality information is being performed. The AT (305) transmits the acquisition information plural times (S710 to S730, corresponding to S430 of FIG. 4).

When a call (or communication) is originated after the AT (305) transmits the acquisition information (P740), the AT (305) temporarily stops the transmission of the acquisition information, and holds the transmission scheduled position/radio waves information in the inside of the AT until the call is broken by the user. During this, the acquisition and storage of the position and the radio information may be continued. After the call is finished by the user, the AT (305) reopens the processing in accordance with the condition of the setting information (S750) For example, the AT (705) collects the held position and radio waves information and may transmits them to the OMC (307).

As stated above, in the series of processings of the acquisition/transmission of the area quality information, in the case where the call origination from the AT by the user occurs, the real-time transmission of the area quality information is unnecessary, and the AT (305) may transmit it at a timing usable for the area quality information transmission.

In FIG. 2, the AT (305-1) repeats the acquisition/transmission processing of the area quality information in a zone 1 (303), and when the user starts to use, the AT (305-2) changes to the operation of call connection priority processing of the user, and the state continues until the call connection is ended (305-3). After the call connection is ended, the transmission of the area quality information is reopened (305-4).

The case as stated above is the same also in the case of extending over different zones. A description will be made with reference to FIG. 3.

The AT (305-1) repeats the acquisition/transmission processing of the area quality information in a zone 1 (303), and when the user starts to use, the AT (305-2) changes to the operation of call connection priority processing of the user. In the case where the user moves to a different zone 2 in this state, and is connected to the different BTS2 (302), after the call connection is ended in this zone 2 (304), the AT (305) transmits the area quality information to the OMC (307) through the BTS2.

Figure 8:
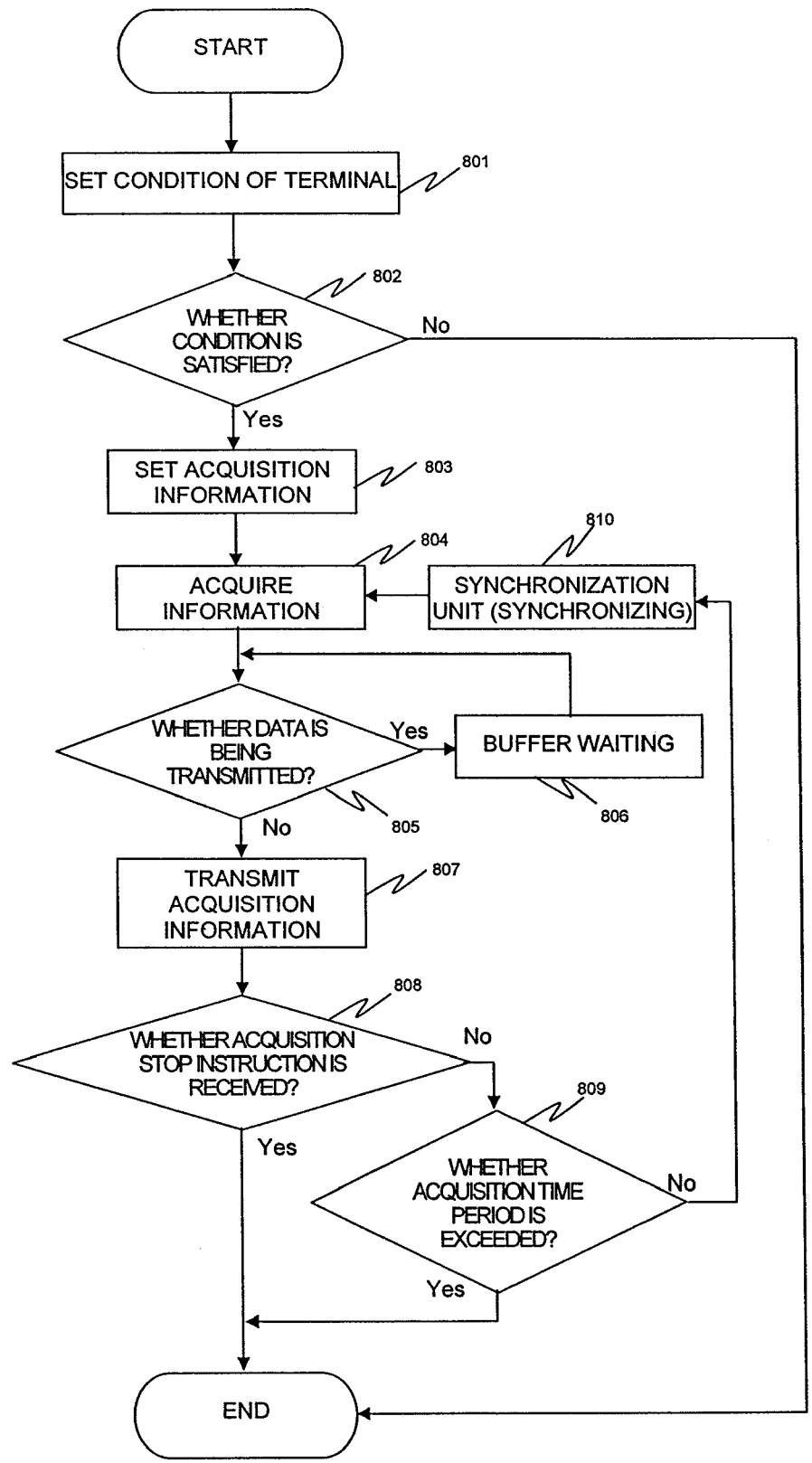
FIG. 8 is a detailed operation flowchart of a terminal AT in the embodiment.

FIG. 8 is an operation flowchart of the AT.

Next, the processing sequence in the inside of the AT will be described with reference to FIG. 8.

When the AT (305) as the object terminal receives the setting information and the acquisition instruction of information (S420), first, the area quality information acquisition condition included in the setting information is set in the application of the AT (305) (801). Here, the AT which is not the object terminal, that is, the AT in which the dedicated application for the area quality information acquisition is not installed does not respond even if the setting information is received (S420).

The application in which the condition is set first determines whether its own AT corresponds to the AT requested by the OMC (307) to acquire the area quality information (802). This determination becomes necessary, for example, in the case where an enormous number of ATs exist in an area. There is a possibility that when the area quality information is acquired from all ATs in an area (station), a large traffic load is temporarily applied to the system. In order to avoid this, for example, with respect to unique identification numbers (manufacture numbers, identification numbers temporarily generated in the call processing, etc.) owned by the respective ATs, a condition is provided to limit the ATs to those having numbers within a specified range or those having even/odd lower one digit, so that the number of ATs which acquires and upload the area quality information can be greatly reduced.

The AT determined to be irrelevant at the determination (802) ends the processing without doing anything. The AT determined to be relevant sets, with respect to an item (type of radio waves information) specified by the area quality information acquisition condition included in the setting information, the output of the information in the chip (CPU to execute the radio communication system) in the inside of the AT (803), and acquires the radio waves information outputted from the chip (804). Besides, in synchronization with the information acquisition from this chip, the AT acquires also the position information from the GPS receiving device provided in the AT (804).

Before the acquired position information and radio waves information are transmitted to the OMC (307), it is determined whether the user is using the AT (305) (805). In the case of using, the transmission scheduled acquisition information (position information and radio waves information) is once stored in the buffer. After this, the use state is periodically monitored until the user breaks the call, and at the time point when the state where the call is finished is confirmed, the information is transmitted to the OMC (307) (807).

After transmitting the position information and the radio waves information to the OMC (307), the AT determines whether the acquisition stop instruction (S450 of FIG. 4, etc.) of the information is received from the OMC (307) (808). In the case where the acquisition stop instruction is received, the AT ends the series of processings at this time point. On the other hand, in the case where the acquisition stop instruction is not received, the AT determines whether the acquisition time period specified by the area quality information acquisition condition included in the setting information (S420) is exceeded (809). In the case where the acquisition time period is exceeded, the AT ends the processing, while in the case where it is not exceeded, in order to synchronize the processing cycle with the acquisition cycle specified by the area quality information acquisition condition, the acquisition cycle matching is performed in the synchronization part (810), and a return is made again to the processing process (804) of the information acquisition.

The processing according to the sequence is performed, so that the acquisition of the area quality information in accordance with the area quality information acquisition condition and the transmission to the OMC are realized.

(Hard Structure)

Figure 9:
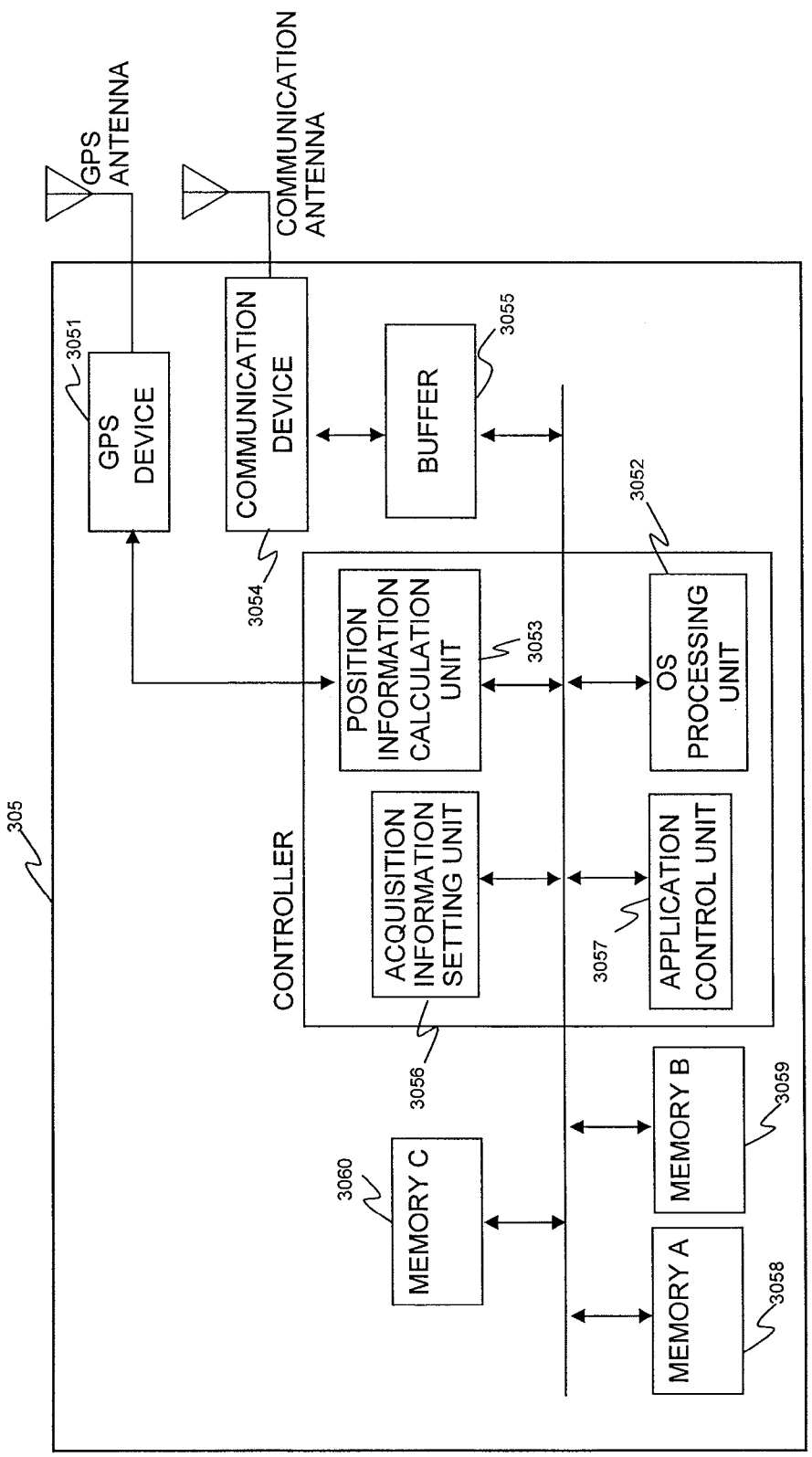
FIG. 9 is a block diagram of a terminal of the embodiment.

FIG. 9 is a block diagram of the wireless access terminal AT (305).

The AT (305) includes a reception device (3051), a controller, a communication device (3054), a buffer (3055) and memories (3058 to 3060). The controller includes an OS processing unit (3052), a position information calculation unit (3053), an acquisition information setting unit (3056), and an application control unit (3057). Incidentally, in the drawing, the memories include the memory A (3058), the memory B (3059) and the memory C (3060), they can include a suitable number of memories and storage units.

The communication device (3054) included in the AT (305) has a communication antenna and a modulation/demodulation function. The communication device (3054) is connected with the buffer (3055) which temporarily stores information to be received/transmitted. The radio communication with the BTS1 (301) is realized by the communication device (3054) and the buffer (3055).

The dedicated application for area quality information acquisition/upload is previously installed in the AT (305), and this application is stored in, for example, the memory A (3058). The OS processing unit (3052) started simultaneously with application of power of AT (305) refers to the memory A (3058) after completion of the start of the OS and starts the dedicated application.

The setting information transmitted from the OMC (307) through the communication device (3054) and the buffer (3055) is once stored in, for example, the memory B (3059). The application control unit (3057) periodically confirms the memory B (3059), and in the case where the setting information (S420) is stored, necessary information is extracted from here, and is set in the acquisition information setting unit (3056). Subsequently, the acquisition information setting unit (3056) acquires the necessary radio waves information from the communication device unit (3054) in accordance with the set content, and stores the acquired radio waves information in the memory B (3059).

Besides, the AT (305) includes the GPS device (3051) as means for acquiring the position information of the AT (305). The reception device (3051) includes a GPS antenna and has functions to receive the GPS signal and to extract necessary information. The position information calculation unit (3053) calculates the latitude/longitude information of the AT (305) based on the GPS signal received through the GPS device (3051). The calculated position information (latitude/longitude) is stored in, for example, the memory B (3059). Incidentally, unique identification information (identification number) previously assigned to each AT is stored in the memory C. The memory C is, for example, a read only memory: ROM (Read Only Memory) and has specifications in which a change can not be made by the user.

After it is confirmed that the radio waves information and the position information are stored in the memory B (3059), the application control unit (3057) combines these informations and the identification information of the memory C and sends them to the communication device (3054) through the buffer (3055). The communication device (3054) transmits these informations to the BTS1 by wireless.

Figure 10:
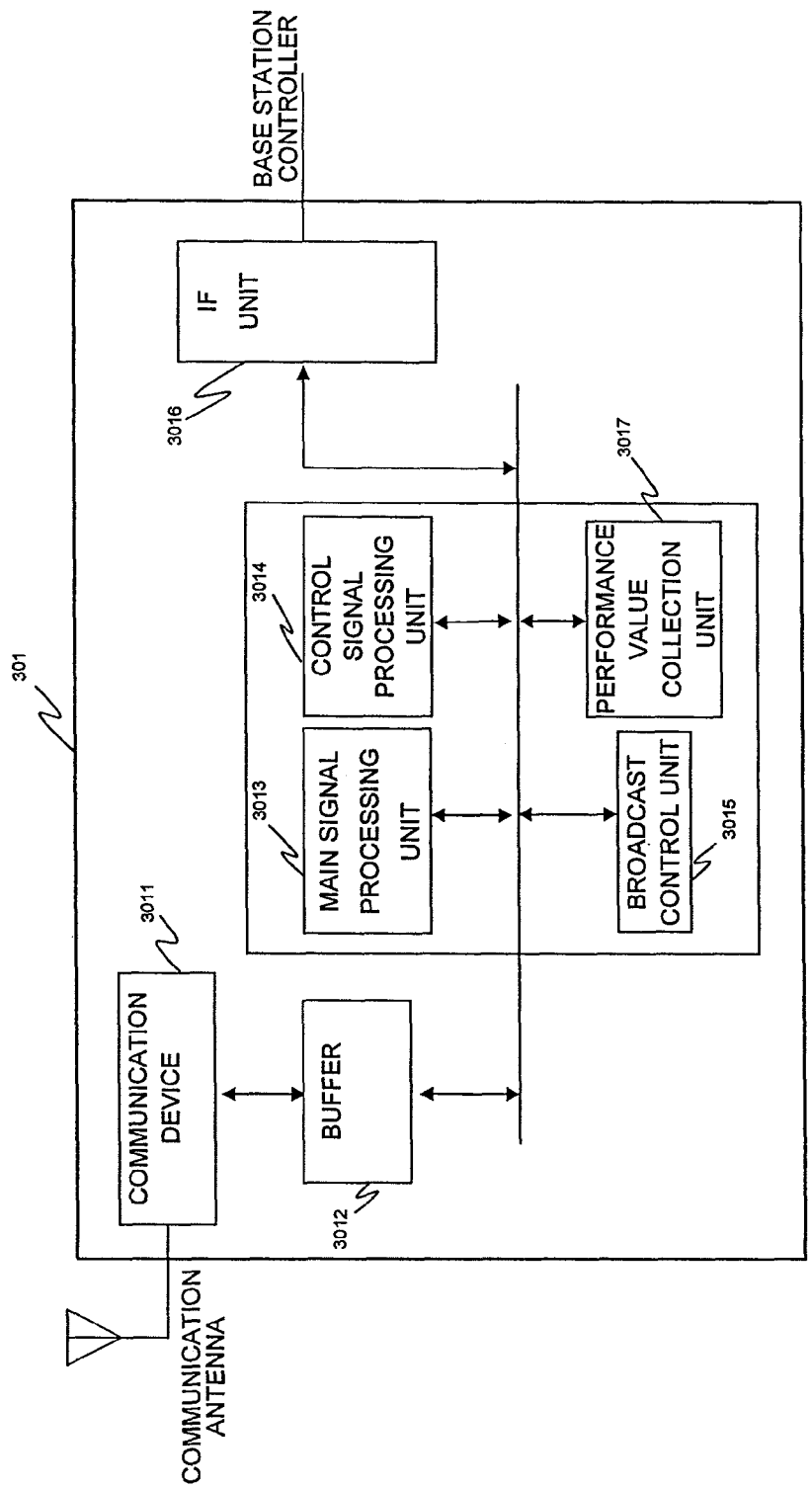
FIG. 10 is a block diagram of a wireless base transceiver station of the embodiment.

FIG. 10 is a block diagram of the wireless base transceiver station BTS (301).

The BTS1 (301) includes a communication device (3011) to enable radio communication with the AT (305) and a buffer (3012), and the communication device (3011) has a communication antenna and a modulation/demodulation function. The communication device (3011) is connected with the buffer (3012) which temporarily stores the information to be received/transmitted.

The BTS1 (301) further includes a main signal processing unit (3013) to process traffic data, a control signal processing unit (3014) to process control information, a broadcast control unit (3015) to perform control/processing necessary to simultaneously distribute (broadcast) the same information to all ATs under control, a performance value collection unit (3017) to collect/assemble various performance values of the BTS1 (301), and an IF unit (3016) as an interface to transfer information to/from the upper base station controller BSC (306). In the BTS1 (301) having received the setting information transmitted by the OMC (307), the setting information (S420) is copied by the broadcast control unit (3015) and is transmitted to all ATs (305) existing in the zone 1 (303) formed by itself.

Incidentally, since the BTS2 (302) shown in FIG. 3 can have the same structure as the BTS1 (301) of FIG. 10, its description will be omitted.

Figure 11:
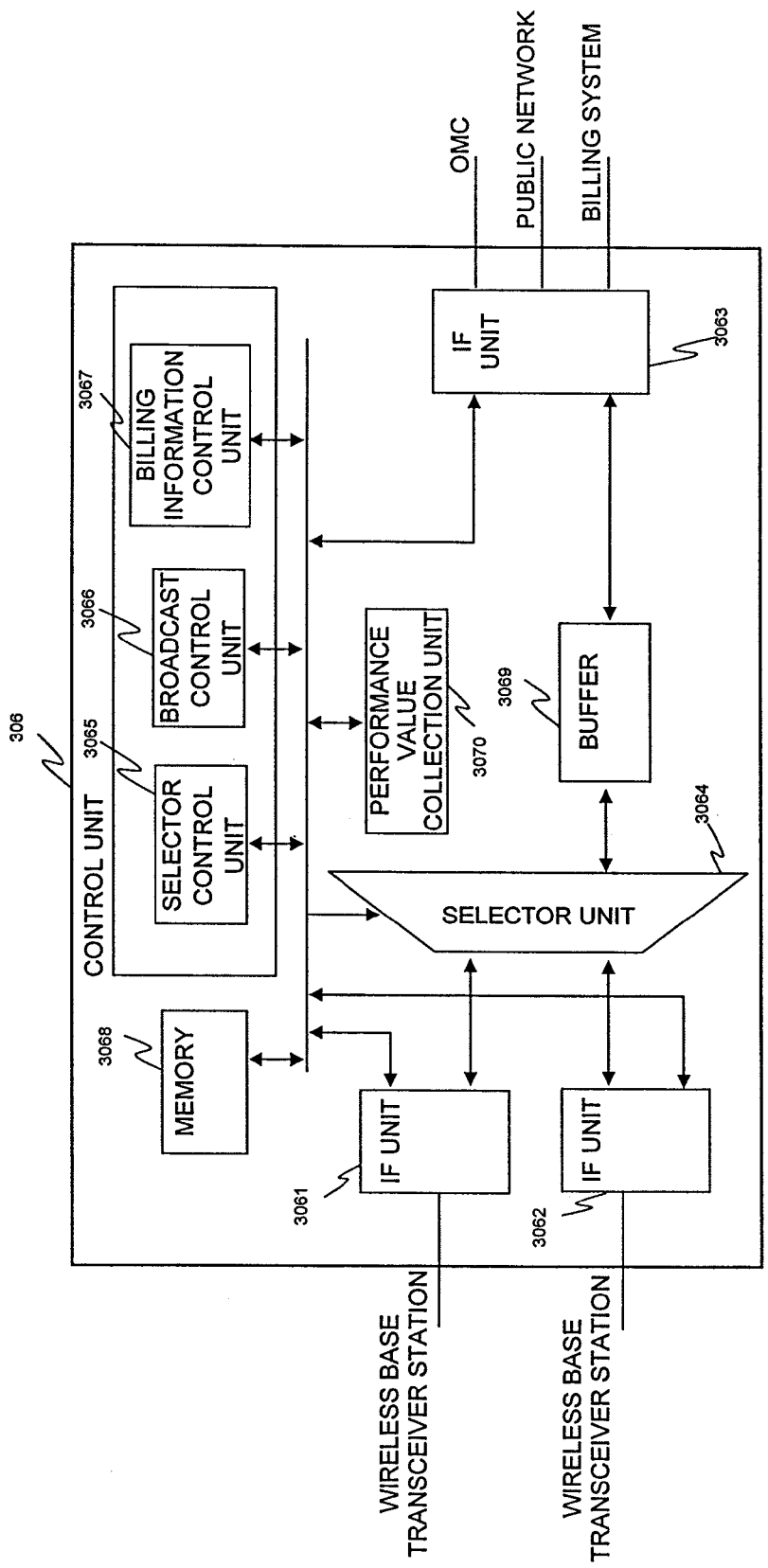
FIG. 11 is a block diagram of a wireless base station controller of the embodiment.

FIG. 11 is a block diagram of the wireless base station controller BSC (306).

The BSC (306) includes an IF unit (3063) to interface with the public network (309), the OMC (307) and the billing system (310), a buffer (3069) to temporarily store data to be transmitted/received, a selector unit (3064) to perform channel selection between the BSC (306) and the plural BTSs, a performance value collection unit (3070) to collect/assemble various performance values of the BSC (306), and IF units (3061, 3062) to interface with a control unit, a memory (3068) and the respective BTSs. The control unit includes a selector control unit (3065), a broadcast control unit (3066), and a billing information control unit (3067).

When the setting information for setting the area quality information acquisition condition to the AT is received through the IF unit (3063), information of an object station to which the setting information is broadcasted is also received from the OMC (307) at the same time. The information of the object station is sent to the broadcast control unit (3066). In the broadcast control unit (3066), the setting information (S420) is copied, and the object station information to cause the setting information (S420) to be routed to all stations or some stations is sent to the selector control unit (3065). The selector control unit (3065) controls the selector unit (3064) based on the object station information, and performs routing.

With respect to all communications relating to the acquisition of the area quality information, in order to prevent the user from being billed for the communication charge, the billing information control unit (3067) encourages the billing system (310) through the IF unit (3063) to exclude the billing for the related call.

Figure 12:
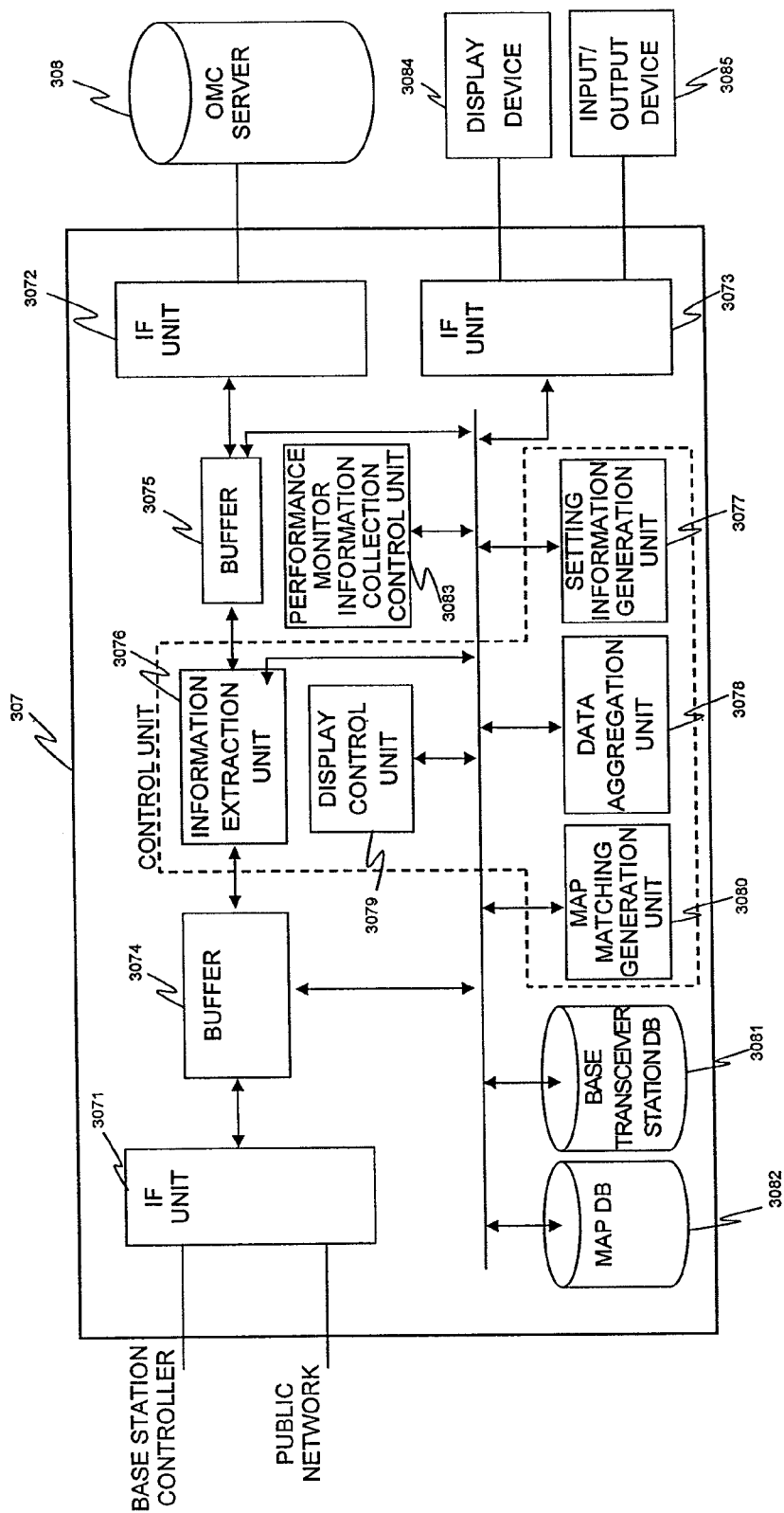
FIG. 12 is a block diagram of an operation maintenance center of the embodiment.

FIG. 12 is a block diagram of the operation maintenance center OMC (307).

The OMC (307) includes an IF unit (3071) to interface with the public network (309) and the base station controller (306), a buffer (3074) to temporarily store data transmitted/received to/from the IF unit (3071), an information extraction unit (3076) to extract necessary information from the acquisition information transmitted from the AT (305), a data aggregation unit (3078) and a map matching generation unit (3080) to perform data aggregation and map matching view generation based on the extracted information, an IF unit (3072) and a buffer unit (3075) to interface with the OMC server (308) and to perform buffering in order to store the information extracted from the acquisition information into the OMC server (308), an IF unit (3073) to interface with an input/output device (3085) and a display device (3084) used by the system administrator to set the area quality information acquisition condition, a setting information generation unit (3077) to generate setting information from the area quality information acquisition condition set in the OMC (307), and a performance monitor/information collection control unit (3083) to monitor performance values of devices in the system, such as the BTS (301) and the BSC (306), and to control the area quality information collection operation as the need arises. Besides, a map DB (3082) and a base transceiver station DB (3081) may be further included.

The OMC (307) does not necessarily exist in one-to-one correspondence to the one BSC, and there can exist a structure in which the OMC is connected to another BSC through the public network (309). The system administrator uses the display device (3084) and the input/output device (3085) connected to the OMC (307), and can set the area quality information acquisition condition and the system limit condition α. The designation of the object station can also be performed in the area quality information acquisition condition set here. The setting information (420) generated in the setting information generation unit (3077) based on the set information is transmitted to the base station controller (306) through the buffer (3074). As the system limit condition a, there is, as an example, a total throughput in station/sector units, a line usage rate, the number of call connections or the like.

The acquisition information (S430) transmitted from the AT (305) and received by the OMC (307) passes through the IF unit (3071) and the buffer (3074), and then, the radio waves information and the position information are extracted by the information extraction unit (3076). On the one hand, the extracted information is stored in the OMC server (308) through the buffer (3075) and the IF unit (3072). On the other hand, the information is sent to the data aggregation unit (3078) and the map matching generation unit (3080). In the data aggregation unit (3078), the information is aggregated in a tabular form, and the aggregation result is sent to the display control unit (3079) and to the OMC server (308) for the purpose of storing the aggregation result.

Besides, the map matching generation unit (3080) obtains the necessary information from the base transceiver station database (base transceiver station DB) (3081) and the map database (map DB) (3082) included in the OMC (307), and generates a map matching view in which the station position, the antenna direction of the station and the PN of the station are shown on the map, and the intensity of the radio waves information is represented by color. The map matching view generated here is sent to the display control unit (3079) and to the OMC server (308) for the purpose of storing the map matching view. The display control unit (3079) performs the necessary control to the display device (3084) and the transfer of the information in order to cause the display device (3084) to display the information received from the data aggregation unit (3078) and the map matching generation unit (3080). The display control unit (3079) functions in various objects, for example, information in another control unit such as the setting information generation unit (3077) is displayed.

The system structure in the embodiment is made the same in both of the periodic information acquisition of the area quality information and the extra information acquisition. Both requests for the periodic and the extra information acquisition can be dealt with by suitably setting the length of the acquisition condition/information acquisition time period included in the setting information (S420) transmitted from the OMC (307).

When the radio waves information acquisition instruction including the identifier of the base transceiver station specified by the administrator is inputted, the OMC (307) can relax the acquisition condition of the radio waves information from the base transceiver station by setting the limit value a to be larger than the limit value.

Incidentally, based on the acquired performance value, the OMC (307) determines the transmission cycle of the information from the wireless access terminal, and may set the acquisition condition including the type of the radio waves information acquired by the wireless access terminal, the transmission time period, and the determined transmission cycle. The OMC (307) transmits the set acquisition condition and the acquisition instruction to the wireless access terminal, and can acquire, in accordance with the acquisition instruction, the area quality information including the position information of the wireless access terminal transmitted from the wireless access terminal at the determined transmission cycle, and the radio waves information between the wireless access terminal at the position and the base transceiver station.

The invention can be used for, for example, a radio communication system, an apparatus to measure area quality of the system, a service and the like.

What is claimed is:

1. A radio service area quality information acquisition system comprising:
    a base transceiver station that communicates with a plurality of wireless access terminals, and measures and outputs a performance value indicating a throughput of its own apparatus, the number of call connections, or the usage rate of the base transceiver station capacity; and
    a maintenance apparatus that acquires area quality information of a radio area of the base transceiver station in accordance with the performance value of the base transceiver station,
    wherein the maintenance apparatus
    transmits a confirmation signal to the plurality of wireless access terminals through the base transceiver station,
    receives an identifier of the wireless access terminal transmitted from one or the plurality of wireless access terminals having received the confirmation signal,
    stores the received identifier of the wireless access terminal correspondingly to an identifier of the base transceiver station,
    acquires a performance value of the base transceiver station from the base transceiver station,
    reads an identifier of a first wireless access terminal corresponding to the identifier of the base transceiver station in a case where the acquired performance value is a previously determined limit value or less,
    transmits an acquisition instruction of information to the first wireless access terminal in accordance with the read identifier of the first wireless access terminal, and
    acquires the area quality information including position information of the first wireless access terminal and radio waves information between the first wireless access terminal at the position and the base transceiver station, which is transmitted from the first wireless access terminal in accordance with the acquisition instruction.

2. The radio service area quality information acquisition system according to claim 1, wherein the maintenance apparatus
    further acquires a second performance value including communication by the first wireless access terminal from the base transceiver station after transmitting the acquisition instruction,
    reads an identifier of a second wireless access terminal corresponding to the identifier of the base transceiver station in a case where the acquired second performance value is the previously determined limit value or less, transmits an acquisition instruction of information to the second wireless access terminal in accordance with the read identifier of the second wireless access terminal, and acquires the area quality information including position information of the second wireless access terminal and radio waves information between the second wireless access terminal at the position and the base transceiver station, which is transmitted from the second wireless access terminal in accordance with the acquisition instruction.

3. The radio service area quality information acquisition system according to claim 1, wherein the maintenance apparatus sets an acquisition condition including a type of the radio waves information acquired by the wireless access terminal, a transmission time period of the information from the wireless access terminal, and a transmission cycle, and transmits the set acquisition condition and the acquisition instruction to the first and/or the second wireless access terminal.

4. The radio service area quality information acquisition system according to claim 1, further comprising a billing server to bill for communication of the wireless access terminal, wherein the maintenance apparatus transmits to the billing server a billing stop instruction to stop billing for transmission of the identifier of the wireless access terminal and/or the area quality information from the first wireless access terminal.

5. The radio service area quality information acquisition system according to claim 1, wherein an application for transmitting the identifier of the wireless access terminal itself in accordance with the confirmation signal and for transmitting the area quality information in accordance with the acquisition instruction is previously installed in the wireless access terminal, and among terminals capable of communicating with the base transceiver station, only the wireless access terminal in which the application is installed responds to the confirmation signal.

6. The radio service area quality information acquisition system according to claim 1, wherein the first and the second wireless access terminals acquire the radio waves information to the base transceiver station and the position information of the terminal themselves periodically in accordance with the acquisition instruction of the information, and when a call connection to another wireless access terminal or device is made, or communication is started, the first and the second wireless access terminals buffers the radio waves information and the position information acquired during the call connection or the communication, and after the call is broken, the first and the second wireless access terminals transmits the buffered radio waves information and position information to the maintenance apparatus.

7. The radio service area quality information acquisition system according to claim 1, wherein the maintenance apparatus determines the number of terminals according to the acquired performance value and a limit value, and reads identifiers of a plurality of wireless access terminals corresponding to the identifier of the base transceiver station in accordance with the determined number of terminals, and transmits acquisition instructions of information to the wireless access terminals in accordance with the read identifiers of the plurality of wireless access terminals.

8. The radio service area quality information acquisition system according to claim 1, wherein the confirmation signal is transmitted through a plurality of the base transceiver stations, and the maintenance apparatus receives the identifier of the wireless access terminal transmitted from the wireless access terminal having received the confirmation signal from one of the base transceiver stations, and the identifier of the base transceiver station, and counts the number of receptions of the identifiers of the wireless access terminals for each of identifiers of the base transceiver stations, and stores a counted value correspondingly to the identifier of the base transceiver station.

9. The radio service area quality information acquisition system according to claim 8, wherein the maintenance apparatus displays the counted value correspondingly to the identifier of the base transceiver station, inputs the identifier of the base transceiver station selected by an administrator in accordance with the display, and acquires the performance value of the base transceiver station in accordance with the inputted identifier of the base transceiver station.

10. The radio service area quality information acquisition system according to claim 8, wherein the maintenance apparatus selects the base transceiver station in which the counted value is a previously determined value or more, and acquires the performance value of the selected base transceiver station.

11. The radio service area quality information acquisition system according to claim 1, wherein in the maintenance apparatus, when a radio waves information acquisition instruction including the identifier of the base transceiver station specified by an administrator is inputted, sets the limit value to be larger than the limit value to relax an acquisition condition of the radio waves information from the base transceiver station.

12. A radio service area quality information acquisition system comprising:

a base transceiver station that communicates with a plurality of wireless access terminals, and measures and outputs a performance value indicating a throughput of its own apparatus, the number of call connections, or a user reception state; and a maintenance apparatus that acquires area quality information of a radio area of the base transceiver station, wherein the maintenance apparatus acquires the performance value of the base transceiver station from the base transceiver station, determines a transmission cycle of information from the wireless access terminal based on the acquired performance value, sets an acquisition condition including a type of radio waves information acquired by the wireless access terminal, a transmission time period, and the determined transmission cycle, transmits the set acquisition condition and an acquisition instruction to the wireless access terminal, and acquires area quality information including position information of the wireless access terminal and radio waves information between the wireless access terminal at the position and the base transceiver station, which is transmitted from the wireless access terminal at the determined transmission cycle in accordance with the acquisition instruction.

* * * * *